(12) United States Patent
Barry

(10) Patent No.: US 11,130,465 B2
(45) Date of Patent: Sep. 28, 2021

(54) AIRBAG INFLATOR MOUNTING SLOTS

(71) Applicant: Autoliv Asp, Inc., Ogden, UT (US)

(72) Inventor: Kenneth G. Barry, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 55 days.

(21) Appl. No.: 16/569,145

(22) Filed: Sep. 12, 2019

(65) Prior Publication Data

US 2021/0078519 A1 Mar. 18, 2021

(51) Int. Cl.
*B60R 21/217* (2011.01)
*B60R 21/215* (2011.01)

(52) U.S. Cl.
CPC .......... *B60R 21/217* (2013.01); *B60R 21/215* (2013.01)

(58) Field of Classification Search
CPC ............................ B60R 21/217; B60R 21/215
See application file for complete search history.

(56) References Cited

U.S. PATENT DOCUMENTS

| | | | | |
|---|---|---|---|---|
| 5,588,675 A * | 12/1996 | Lotspih | ................. | B60R 21/201 280/732 |
| 5,899,485 A * | 5/1999 | Folsom | ................. | B60R 21/201 280/728.2 |
| 6,231,068 B1 * | 5/2001 | White, Jr. | ............. | B60R 21/207 280/728.2 |
| 6,561,538 B2 * | 5/2003 | Ford | ................... | B60R 21/2035 280/728.2 |
| 6,851,710 B2 * | 2/2005 | Wong | .................... | B60R 21/213 280/743.2 |
| 7,789,422 B2 * | 9/2010 | Webber | ............... | B60R 21/2338 280/743.2 |
| 7,887,086 B2 * | 2/2011 | Kalandek | .............. | B60R 21/213 280/728.2 |

(Continued)

FOREIGN PATENT DOCUMENTS

| | | | | |
|---|---|---|---|---|
| CN | 108639002 | | 10/2018 | |
| DE | 102010012136 A1 * | | 9/2011 | ........... B60R 21/217 |

(Continued)

OTHER PUBLICATIONS

CN108639002, Oct. 12, 2018, Lixin Jianghuai Yangtian Car Limited Company, Machine Translation.

(Continued)

*Primary Examiner* — Nicole T Verley
(74) *Attorney, Agent, or Firm* — Matthew D. Thayne; Thayne and Davis LLC

(57) ABSTRACT

Airbag modules comprising inflator mounting openings and/or slots. Some embodiments may comprise a cover having an inflator coupled thereto and may further comprise a fastener used to couple the inflator with the housing. A mounting opening may be configured to receive the fastener, wherein the mounting opening is configured to allow material defining the mounting opening to flex during installation of the fastener to reduce a force required to advance the fastener through the mounting opening. The mounting opening may be further configured to resist withdrawal of the fastener after being fully seated in the mounting opening such that a greater amount of force is required to withdraw the fastener from the mounting opening than is required to advance the fastener through the mounting opening.

18 Claims, 6 Drawing Sheets

(56) References Cited

U.S. PATENT DOCUMENTS

2003/0085554 A1* 5/2003 Thomas .............. B60R 21/2171
                                                            280/728.3
2019/0176741 A1* 6/2019 Inoue .................... B60R 21/207

FOREIGN PATENT DOCUMENTS

| JP | 2000025554 A * | 1/2000 | ......... B60R 21/2176 |
| JP | 5028305 B2 * | 9/2012 | |
| KR | 101695241 | 1/2017 | |

OTHER PUBLICATIONS

KR101695241, Jan. 12, 2017, Autoliv Development AB, Machine Translation.

* cited by examiner

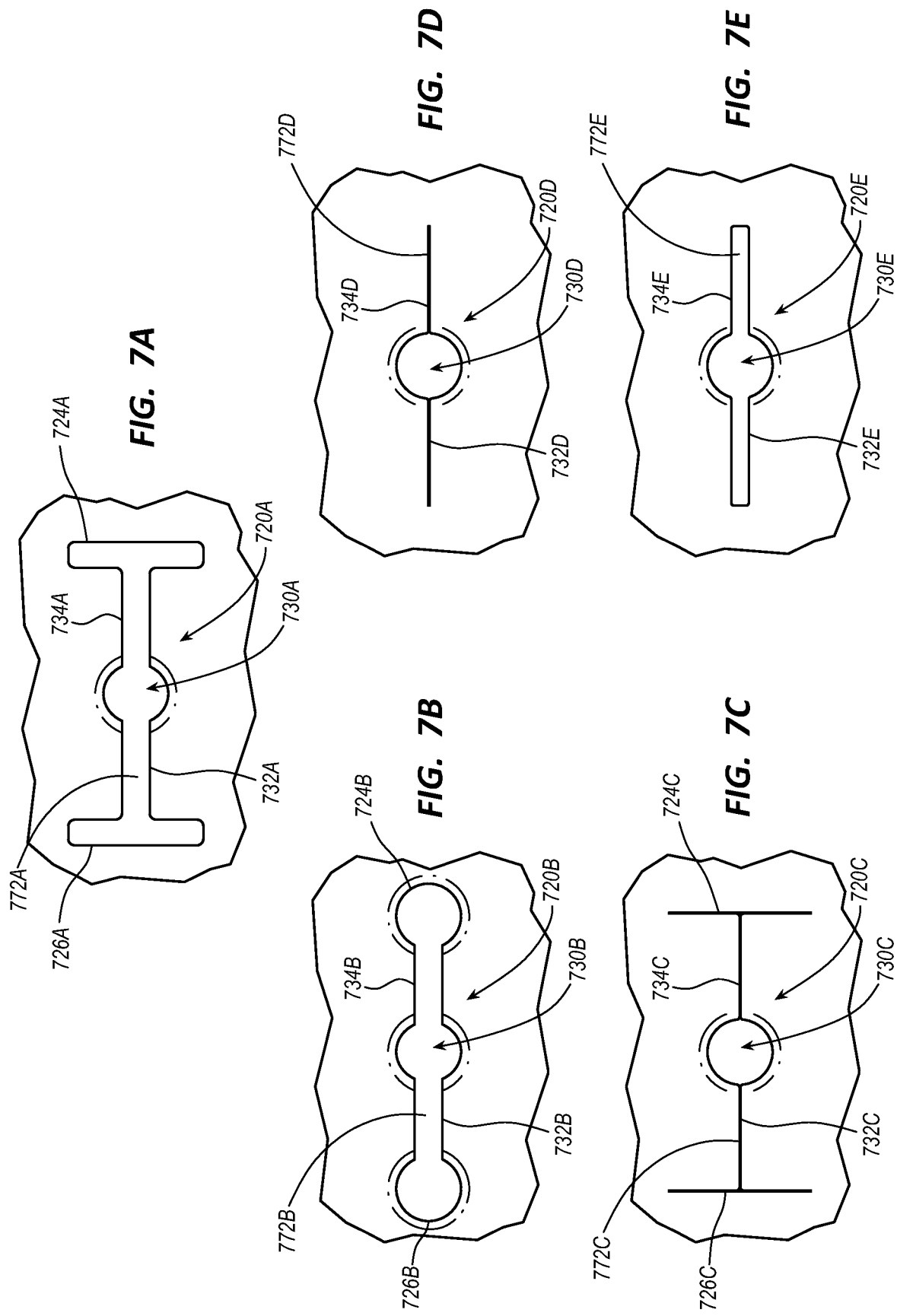

AIRBAG INFLATOR MOUNTING SLOTS

SUMMARY

Various airbag modules, including certain side airbag modules, utilize a means for mounting the inflator to the housing or another feature of the module that uses a threaded mounting stud that extends through an opening in the housing. Often another stud is used that is rigidly mounted to the housing, but it may be desirable to allow for one or more such studs, or other fasteners, to be secured in a condition allowing for a certain amount of movement, flexibility, or "play." However, such designs can suffer from a variety of drawbacks, including the undesirable possibility of the stud recessing back into the cover of the module during assembly, undesirably high forces required to insert the stud/fastener, and/or binding conditions.

The present inventors have therefore determined that it would be desirable to provide apparatus, systems and methods that overcome one or more of the foregoing limitations and/or other limitations of the prior art. In some embodiments, the inventive concepts disclosed herein may therefore provide for an opening for receiving a stud or other fastener from an inflator having a fastener hole and one or more slots. Preferred embodiments may provide for a desirable force differential between push in and pull out forces and/or may overcome a required interference condition between the fastener and the material defining the opening (higher pull out forces compared to the push in forces).

In a more particular example of an airbag cushion module according to some embodiments, the airbag cushion module may comprise a cover having an inflator coupled thereto and may further comprise a fastener, such as a mounting stud, configured to couple the inflator with the housing. A mounting opening, which may be formed in the housing in some embodiments, may be configured to receive the fastener. The mounting opening may be configured to allow material defining the mounting opening to flex during installation of the fastener to reduce a force required to advance the fastener through the mounting opening. The mounting opening may be further configured to resist withdrawal of the fastener after being fully seated in the mounting opening such that a greater amount of force is required to withdraw the fastener from the mounting opening than is required to advance the fastener through the mounting opening.

In some embodiments, the mounting opening may comprise a plurality of slots, at least two slots of which may be angled relative to one another. In some such embodiments, the plurality of slots may comprise a first slot extending in a first direction and a second slot positioned opposite from the first slot and extending at least substantially parallel to the first slot. A third slot may extend between the first slot and the second slot, in some embodiments at a perpendicular, or at least substantially perpendicular, angle relative to the first and/or second slots.

In some embodiments, the third slot may comprise opposing grooves defining a fastener hole for receiving the fastener therethrough. In some embodiments, the fastener hole may comprise one or more tapered edges that may define a wedge shape.

In another example of an airbag module according to other embodiments, the module may comprise an inflator comprising a mounting stud coupled thereto and a mounting opening configured to receive the mounting stud to couple the inflator to an element within which the mounting opening is formed. The mounting opening may define one or more bendable sections, such as a first bendable section and a second bendable section positioned opposite from the first bendable section. The mounting opening may further comprise a fastener hole that may be at least partially defined by the first bendable section and the second bendable section. The fastener hole may be configured to receive the mounting stud therethrough, and the first bendable section and the second bendable section may be configured to bend during insertion of the mounting stud to decrease a force required to advance the mounting stud through the fastener hole.

In some embodiments, the first bendable section may be defined at least in part by a first slot, a second slot, and a third slot. In some such embodiments, the first and second slots may extend at least substantially parallel to one another and the third slot may extend between the first and second slots.

In some embodiments, the hole may be defined by a first groove formed in the first bendable section and a second groove formed in the second bendable section.

In some embodiments, the second bendable section may be defined at least in part by the first slot, the second slot, and the third slot. In some embodiments, one or more of the first slot, the second slot, and the third slot may comprise a slot defining an opening having space between opposing walls thereof. In other embodiments, one or more of the slots may comprise a slit lacking such space.

In some embodiments, the mounting opening may be configured to allow material defining the mounting opening to flex during installation of the mounting stud to reduce a force required to advance the mounting stud through the mounting opening. The mounting opening may be further configured to resist withdrawal of the mounting stud after being fully seated in the mounting opening such that a greater amount of force is required to withdraw the mounting stud from the mounting opening than is required to advance the mounting stud through the mounting opening.

In some embodiments, the element within which the mounting opening is formed may comprise an airbag cover.

In some embodiments, at least a portion of the hole may comprise a tapered edge to define a wedge shape. In some such embodiments, the entire surface defining the hole, such as both opposing surfaces/grooves of a partially circular hole, may be tapered. In some embodiments, the hole may be defined by a first tapered edge of the first bendable section and a second tapered edge of the second bendable section.

In still another example of an airbag module according to some embodiments, the module may comprise a cover comprising a mounting opening and an inflator comprising a mounting stud. The mounting stud may be configured to be received in the mounting opening and may comprise a first slot extending in a first direction; a second slot positioned opposite from the first slot and extending at least substantially in the first direction; and a third slot extending between the first slot and the second slot. In some embodiments, the third slot may comprise opposing grooves defining a stud hole for receiving the mounting stud therethrough, such as a tapered stud hole in some embodiments.

In some embodiments, the mounting opening may define an at least substantially H-shaped opening.

In some embodiments, the mounting opening may be configured to allow the cover adjacent to the mounting opening to flex during installation of the mounting stud to reduce a force required to advance the mounting stud through the mounting opening. In some such embodiments, the mounting opening may be further configured to resist withdrawal of the mounting stud after being fully seated in the mounting opening such that a greater amount of force is required to withdraw the mounting stud from the mounting opening than is required to advance the mounting stud through the mounting opening.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIGS. 7A-7E depict various alternative embodiments of slotted mounting openings.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
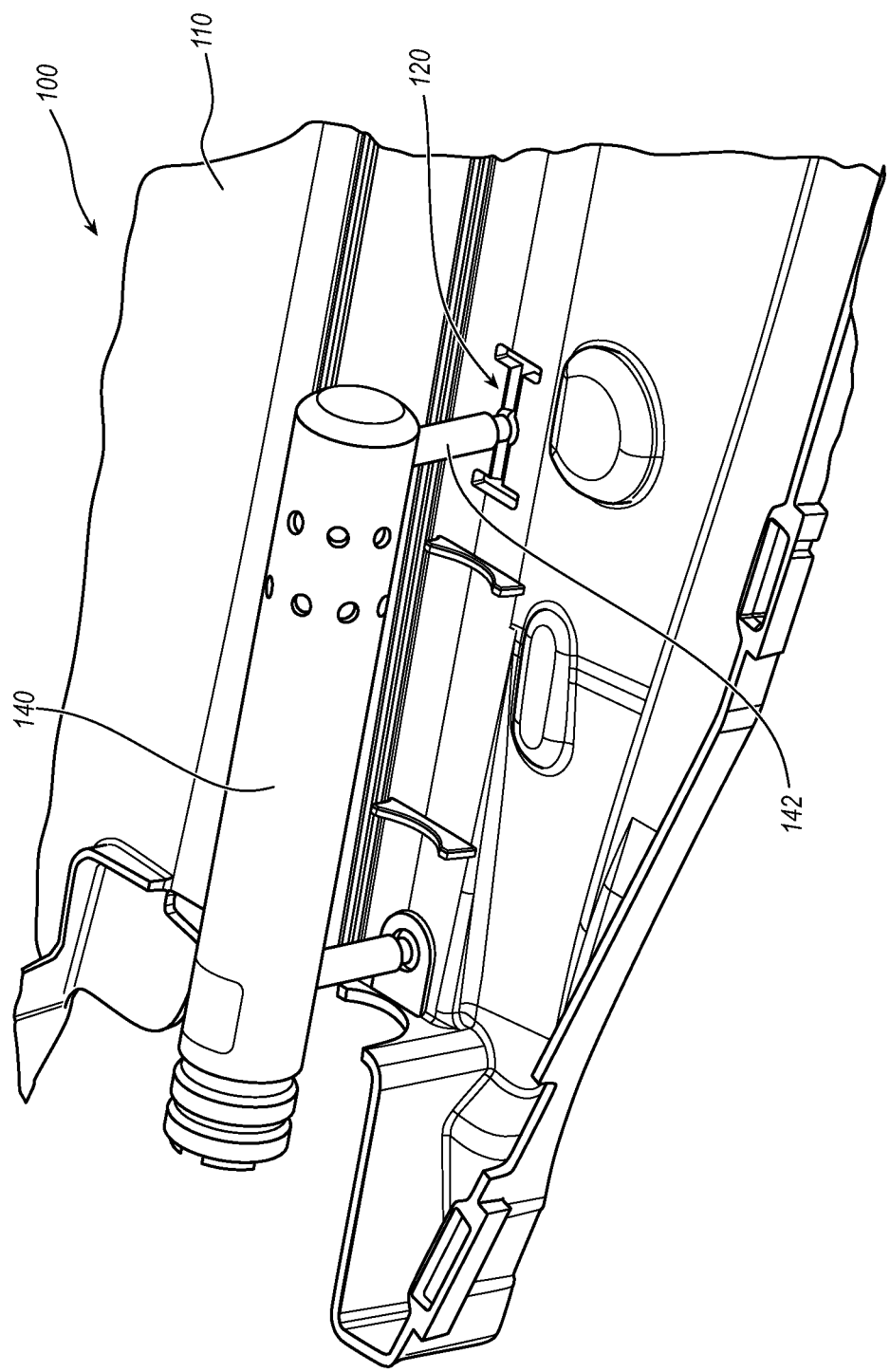
FIG. 1 is a partial, perspective view of an airbag cover and inflator according to some embodiments, the cover comprising a slotted mounting opening.

FIG. 1 depicts an airbag module 100, which may comprise, for example, a side airbag module for use in connection with a vehicle. Airbag module 100 comprises a housing or cover 110 and FIG. 1 depicts a portion of module 100 including an inflator 140 and various elements used to mount or otherwise couple inflator 140 to cover 110. More particularly, a fastener 142, which in the depicted embodiment comprises a threaded stud, is shown extending through a mounting opening 120 formed within cover 110.

As described in greater detail below, in some embodiments, mounting opening 120 may be configured to flex during installation of fastener 142 to reduce a force required to advance fastener 142 through mounting opening 120, and may be further configured to resist withdrawal of fastener 142 after being fully seated in mounting opening 120 such that a greater amount of force is required to withdraw fastener 142 from mounting opening 120 than is required to advance fastener 142 through mounting opening 120. Various features and aspects of preferred mounting openings in connection with other figures.

Other fasteners may be used to couple inflator 140, as shown in FIG. 1. However, in preferred embodiments, the other fastener or fasteners may be rigidly affixed to housing 110 or to another fixed part of module 100 such that only one fastener 142 is somewhat loosely or less than fully rigidly coupled with a mounting opening 120 to allow for some movement and release or energy during deployment of inflator 140.

Figure 2:
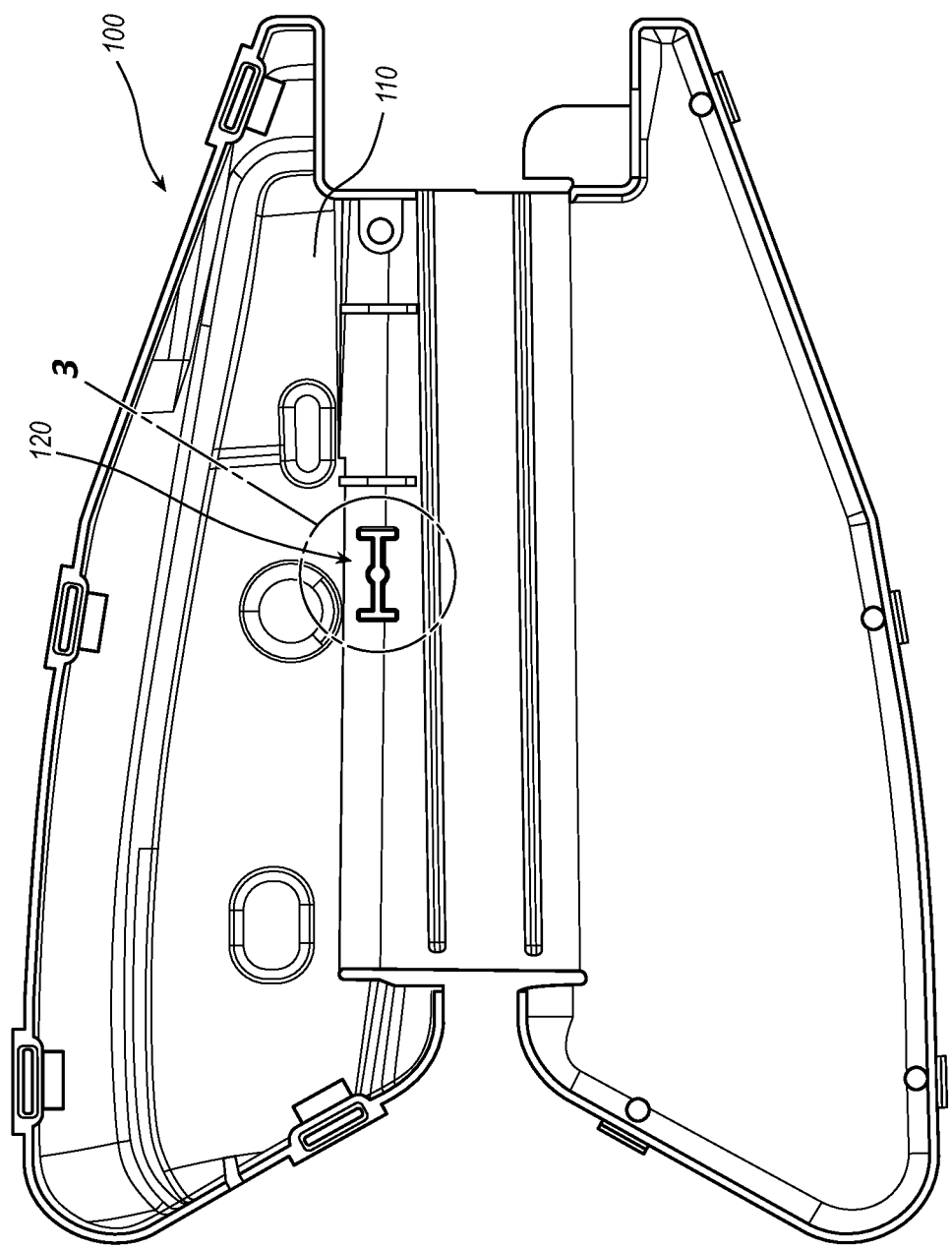
FIG. 2 is a plan view of the airbag cover of FIG. 1 with the inflator removed.
Figure 3:
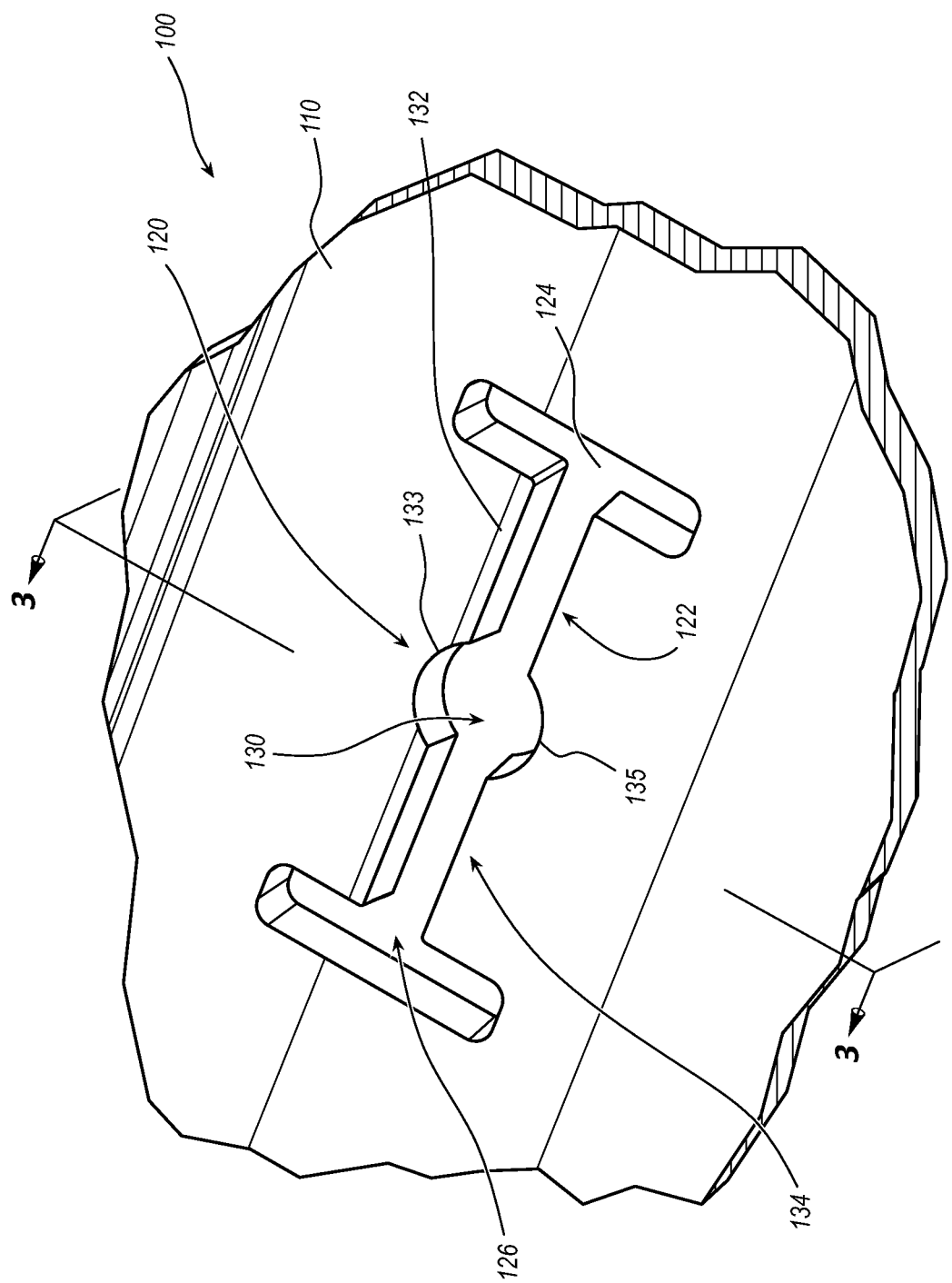
FIG. 3 is a close-up view of the slotted mounting opening.

FIG. 2 depicts airbag module 100 with inflator 140 removed to provide a better view of mounting opening 120 and FIG. 3 provides a close-up view of mounting opening 120. As shown in FIG. 3, mounting opening 120 comprises a plurality of slots that, in the depicted embodiment, are interconnected and/or angled with respect to one another. More particularly, mounting opening 120 comprises a first slot 124 extending in a first direction on a first side of mounting opening 120, a second slot 126 positioned opposite from the first slot 124 and extending parallel to the first slot 124 (or in other embodiments at least substantially parallel thereto). Mounting opening 120 further comprises a third slot 122 extending between the first slot 124 and the second slot 126 at a perpendicular angle (again, in other embodiments, this may be at least substantially perpendicular or not angled but not perpendicular or substantially perpendicular).

Third slot 122 comprises opposing grooves, namely, a first groove 133 and a second groove 135, that collectively define a fastener hole 130 for receiving the fastener 142 therethrough.

As also shown in FIG. 3, mounting opening 120 is alternatively defined by various bendable sections that may be facilitated and/or defined by the various slots or other openings previously discussed. More particularly, in the depicted embodiment, mounting opening 120 defines a first bendable section 132 and a second bendable section 134 positioned opposite from the first bendable section 132. These bendable sections are partially defined by slot 122 and partially by opposing slots 124 and 126.

In addition, fastener hole 130 is partially defined by first bendable section 132 and partially by second bendable section 134 in that grooves 133 and 135 are formed, respectively, in these opposing bendable sections. As previously mentioned, fastener hole 130 is configured to receive a mounting stud or other fastener therethrough, and first bendable section 132 and second bendable section 134 are configured to bend during insertion of the mounting stud or other fastener to decrease a force required to advance the fastener/mounting stud through hole 130.

Figure 4:
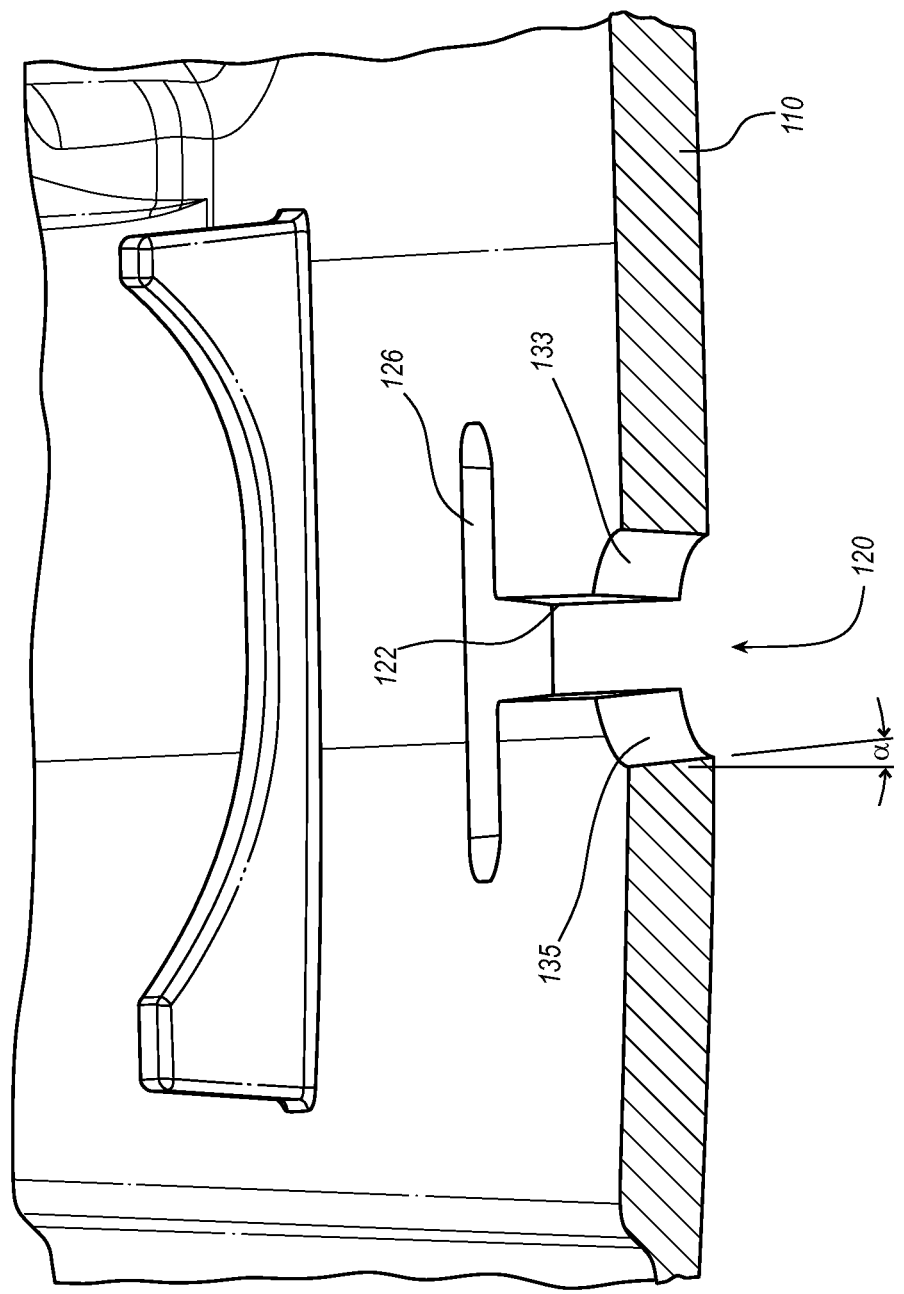
FIG. 4 is a cross-sectional view taken along line 3-3 in FIG. 3.

In addition, as illustrated in the cross-sectional view of FIG. 4, in preferred embodiments, hole 130 is tapered so as to define a wedge shape. For example, in the depicted embodiment, grooves 133 and 135 taper to define a hole 130 that has a larger cross-sectional area at the surface proximal the stud/fastener during assembly such that the push-in force of the fastener is less than the pull-out force of the fastener, which may allow for resistance of stud/fastener movement to improve retention of the stud/fastener without requiring other fasteners or hardware, such as clips and retainers. This benefit may be enhanced during use of threaded studs/fasteners, since the smaller surface/side of the fastener hole 130 may engage the grooves of the fastener threads to further increase pull-out forces. The taper angle α of one or both sides of hole 130 may be, for example, between about five degrees and about fifteen degrees. In some such embodiments, the taper angle α of one or both sides of hole 130 may be between about seven degrees and about eleven degrees.

Although, in the depicted embodiment, both grooves defining hole 130 may be tapered, a similar benefit may be obtained in other embodiments by tapering only one side/groove of hole 130. In still other embodiments, the hole 130 may comprise a fully circular hole rather than a hole partly defined by opposing grooves and therefore a partly circular hole as shown in FIG. 3. Thus, in some such embodiments, the entire surface defining the hole may be tapered or, alternatively, only a portion (such as one side) of this surface may be tapered.

Figure 6:
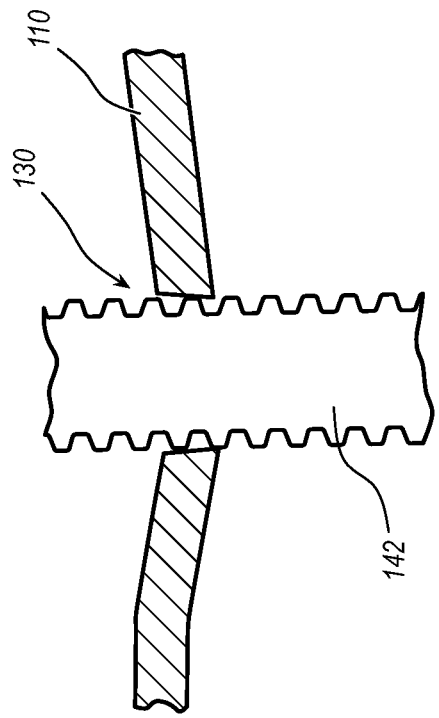
FIG. 6 is a close-up view depicting the wedge features of the fastener hole of FIG. 5.
Figure 5:
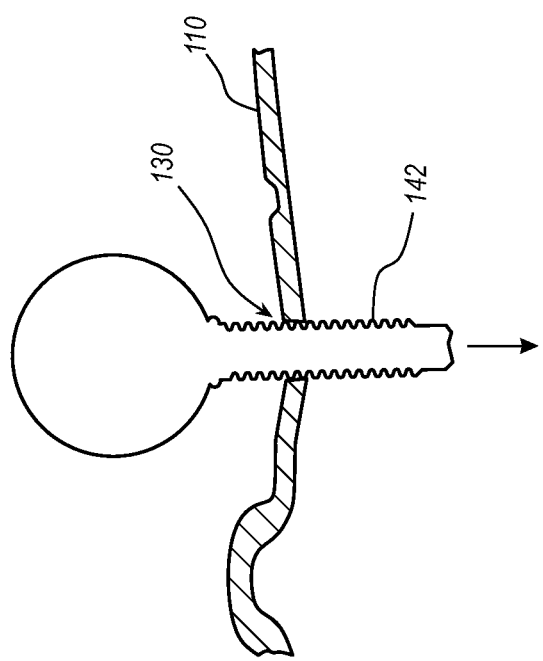
FIG. 5 depicts a fastener being advanced through a fastener hole of a slotted mounting opening.

FIGS. 5 and 6 depict a fastener 142 being advanced through a hole 130 formed within a cover 110 or, in other contemplated embodiments, another part of an airbag module during assembly. As shown in FIG. 5, fastener 142 may be advanced through hole 130, which may comprise a taper or other wedge-shape as previously mentioned. This wedge shape is better seen in FIG. 6, which is a close-up view of the assembly step of FIG. 5. Thus, the push-in force (indicated by the arrow in FIG. 5) is larger than the pull-out force required to withdraw fastener 142 from hole 130. Again, this force differential may be provided by the tapering edge(s), wedge features, and/or by the various slots and/or bendable sections previously mentioned, which may allow the material defining a mounting opening to flex during assembly.

FIGS. 7A-7E depict various alternative embodiments of mounting openings that, in preferred embodiments and implementations, may be used for coupling an inflator to a housing or another part of an airbag module to improve retention of a fastener inserted through the mounting opening, provide a force differential between push-in and pull-out forces of such fastener, and/or provide a loose fit condition to avoid undesirable binding conditions. FIG. 7A illustrates a mounting opening 720A that resembles those discussed above and illustrated in earlier figures. Thus, mounting opening 720A includes a first slot 724A extending in a first direction on a first side of mounting opening 720A, a second slot 726A positioned opposite from the first slot 724A and extending parallel to the first slot 724A, and a third slot 722A extending between the first slot 724A and the second slot 726A at a perpendicular angle. Similarly, a fastener hole 730A is positioned in between opposing slots 724A/726A for receiving a fastener therethrough and the various slots of mounting opening 720A define opposing bendable members and/or sections 732A and 734A.

FIG. 7B illustrates an alternative configuration for a mounting opening. Thus, mounting opening 720B includes a first slot 724B positioned on a first side of mounting opening 720B and a second slot 726B is positioned opposite from the first slot 724B. However, slots 724B and 726B are rounded/circular slots rather than straight slots as in mounting opening 720A. A third slot 722B extends in a straight line between the first slot 724B and the second slot 726B at a perpendicular angle. Similarly, a fastener hole 730B is positioned in between opposing slots 7246/726B for receiving a fastener therethrough. Also, the various slots of mounting opening 720B again define opposing bendable members and/or sections 732B and 734B in order to facilitate the force differential referenced above between push in and pull out forces. Also, as is the case with all embodiments discussed herein, in preferred embodiments, one or more sides and/or portions of hole 730B may have tapered and/or wedged surfaces to enhance such property.

Another alternative configuration for a mounting opening is shown in FIG. 7C. Mounting opening 720C is positioned on a first side of mounting opening 720C and a second slot 726C positioned opposite from the first slot 724C. Like mounting opening 720A, slots 724C and 726C are straight slots. However, unlike mounting opening 720A, slots 724C and 726C are slits that lack any appreciable space between opposing walls/surfaces of slots 724C and 726C. In other words, slit-like slots 724C and 726C, along with interconnecting slit 722C, may be formed by simply cutting through the material within which mounting opening 720C is formed rather than cutting and removing material therefrom to define a wider opening. Once again, a fastener hole 730C is positioned in between opposing slots 724C/726C for receiving a fastener therethrough and slots 722C, 724C, and 726C collectively define opposing bendable members and/or sections 732C and 734C in order to facilitate the force differential referenced above between push in and pull out forces.

Yet another alternative configuration for a mounting opening is shown in FIG. 7D. Mounting opening 720D of FIG. 7D includes a slot 722D that extends along and through a centrally-positioned hole 730D. Because slot 722D extends in a straight line (in other words, the portions of slots 722D positioned on either side of hole 730D are aligned with one another), it may be considered a single slot. However, as those of ordinary skill in the art will readily appreciate, in other embodiments separate slots and/or slot portions may be positioned on opposite sides of such a hole and need not be strictly aligned with one another. Again, as with slots 724C and 726C, slot 722D is formed as a slit that lacks any appreciable space between opposing walls/surfaces thereof. Slot 722D and opening 730D collectively define opposing bendable members and/or sections 732D and 734D in order to facilitate the force differential referenced above between push in and pull out forces.

Still another alternative configuration for a mounting opening is shown in FIG. 7E. Mounting opening 720E of FIG. 7E again includes a slot 722E that extends along and through a centrally-positioned hole 730E. However, unlike mounting opening 720D, mounting opening 720E contains a slot 722E that defines an opening with space between its opposing sidewalls/surfaces. Slot 722E, and each of the other embodiments having spaced openings rather than slits, may, in preferred embodiments, have a slot/opening width of between about 1 and about 3 mm. In more preferred such embodiments, the slot/opening may have a width of about 2 mm. Again, slot 722E and opening 730E collectively define opposing bendable members and/or sections 732E and 734E, which, together with tapered and/or wedged fastener-receiving surfaces in some embodiments, may facilitate the force differential referenced above between push in and pull out forces.

It can also be seen that some of the mounting opening embodiments disclosed herein define, or at least substantially define, an H-shape, including the embodiments depicted in FIGS. 7A and 7C.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag module, comprising:
   a cover;
   an inflator coupled with the cover;
   an at least substantially cylindrical fastener coupled with the inflator; and
   a mounting opening configured to receive the fastener, wherein the mounting opening comprises a plurality of slots, at least two slots of which are angled relative to one another, and wherein the plurality of slots comprises:
   a first slot extending in a first direction;
   a second slot positioned opposite from the first slot and extending at least substantially parallel to the first slot; and
   a third slot extending between the first slot and the second slot.

2. The airbag module of claim 1, wherein the mounting opening is formed within the cover.

3. The airbag module of claim 1, wherein the mounting opening is configured to allow material defining the mounting opening to flex during installation of the fastener to reduce a force required to advance the fastener through the mounting opening, and wherein the mounting opening is further configured to resist withdrawal of the fastener after being fully seated in the mounting opening such that a greater amount of force is required to withdraw the fastener from the mounting opening than is required to advance the fastener through the mounting opening.

4. The airbag module of claim 1, wherein the third slot comprises opposing grooves defining a fastener hole for receiving the fastener therethrough.

5. The airbag module of claim 1, wherein the fastener comprises a mounting stud.

6. The airbag module of claim 1, wherein the mounting opening comprises a fastener hole for receiving the fastener therethrough.

7. The airbag module of claim 6, wherein the fastener hole comprises at least one tapered edge defining a wedge shape.

8. An airbag module, comprising:
   an inflator comprising a mounting stud coupled thereto; and
   a mounting opening configured to receive the mounting stud to couple the inflator to an element within which the mounting opening is formed, wherein the mounting opening defines:
   a first bendable section;
   a second bendable section positioned opposite from the first bendable section; and
   an at least substantially circular hole at least partially defined by the first bendable section and the second bendable section, wherein the hole is configured to receive the mounting stud therethrough, wherein the first bendable section and the second bendable section are configured to bend during insertion of the mounting stud to decrease a force required to advance the mounting stud through the hole, and wherein at least a portion of the hole comprises a tapered edge defining a wedge shape.

9. The airbag module of claim 8, wherein the first bendable section is defined at least in part by a first slot, a second slot, and a third slot, wherein the first and second slots extend at least substantially parallel to one another and wherein the third slot extends between the first and second slots.

10. The airbag module of claim 9, wherein the hole is defined by a first groove formed in the first bendable section and a second groove formed in the second bendable section.

11. The airbag module of claim 9, wherein the second bendable section is defined at least in part by the first slot, the second slot, and the third slot, and wherein at least one of the first slot, the second slot, and the third slot comprises a slot defining an opening having space between opposing walls thereof.

12. The airbag module of claim 8, wherein the mounting opening is configured to allow material defining the mounting opening to flex during installation of the mounting stud to reduce a force required to advance the mounting stud through the mounting opening, and wherein the mounting opening is further configured to resist withdrawal of the mounting stud after being fully seated in the mounting opening such that a greater amount of force is required to withdraw the mounting stud from the mounting opening than is required to advance the mounting stud through the mounting opening.

13. The airbag module of claim 8, wherein the element within which the mounting opening is formed comprises an airbag cover.

14. The airbag module of claim 8, wherein the hole is defined by a first tapered edge of the first bendable section and a second tapered edge of the second bendable section.

15. An airbag module, comprising:
- a cover comprising a mounting opening; and
- an inflator comprising a mounting stud, wherein the mounting stud is configured to be received in the mounting opening, and wherein the mounting opening comprises:
  - a first slot extending in a first direction;
  - a second slot positioned opposite from the first slot and extending at least substantially in the first direction; and
  - a third slot extending between the first slot and the second slot, wherein the third slot comprises opposing grooves defining a stud hole for receiving the mounting stud therethrough.

16. The airbag module of claim 15, wherein the mounting opening defines an at least substantially H-shaped opening.

17. The airbag module of claim 15, wherein the stud hole comprises a tapered stud hole.

18. The airbag module of claim 15, wherein the mounting opening is configured to allow the cover adjacent to the mounting opening to flex during installation of the mounting stud to reduce a force required to advance the mounting stud through the mounting opening, and wherein the mounting opening is further configured to resist withdrawal of the mounting stud after being fully seated in the mounting opening such that a greater amount of force is required to withdraw the mounting stud from the mounting opening than is required to advance the mounting stud through the mounting opening.

\* \* \* \* \*